(12) United States Patent
Land

(10) Patent No.: US 7,059,765 B2
(45) Date of Patent: Jun. 13, 2006

(54) TEMPERATURE MEASURING APPARATUS AND RELATED IMPROVEMENTS

(75) Inventor: David Victor Land, Glasgow (GB)

(73) Assignee: The University Court of the University of Glasgow, Glasgow (GB)

( * ) Notice: Subject to any disclaimer, the term of this patent is extended or adjusted under 35 U.S.C. 154(b) by 0 days.

(21) Appl. No.: 10/236,351

(22) Filed: Sep. 6, 2002

(65) Prior Publication Data
US 2003/0026320 A1 Feb. 6, 2003

Related U.S. Application Data

(63) Continuation of application No. PCT/GB01/01028, filed on Mar. 9, 2001.

(30) Foreign Application Priority Data
Mar. 10, 2000 (GB) .................... 0005925.3

(51) Int. Cl.
G01J 5/00 (2006.01)
(52) U.S. Cl. .............. 374/121; 374/131; 374/122
(58) Field of Classification Search .......... 374/120, 374/121, 122, 130, 131, 141, 129, 117, 118
See application file for complete search history.

(56) References Cited

U.S. PATENT DOCUMENTS

| | | | | |
|---|---|---|---|---|
| 2,588,610 A * | 3/1952 | Boothroyd et al. | ......... | 343/753 |
| 2,785,860 A * | 3/1957 | Harrison et al. | ............ | 374/129 |
| 2,994,873 A * | 8/1961 | Goubau | ....................... | 343/753 |
| 3,373,869 A * | 3/1968 | Burson, Jr. | ................... | 209/3.1 |
| 3,586,970 A | 6/1971 | Conway | ..................... | 324/58.5 |
| 3,815,139 A * | 6/1974 | Lewis et al. | ................. | 343/775 |
| 3,884,075 A * | 5/1975 | Brendli et al. | .............. | 374/129 |
| 3,916,690 A * | 11/1975 | Brandli | ...................... | 374/129 |
| 4,106,340 A * | 8/1978 | Hamid | ....................... | 374/122 |
| 4,160,144 A * | 7/1979 | Kashyap et al. | ............ | 333/227 |
| 4,235,107 A * | 11/1980 | Lüdeke et al. | ............. | 374/122 |
| 4,249,148 A * | 2/1981 | Jachowski | ................... | 333/208 |
| 4,409,042 A * | 10/1983 | Dornberger et al. | ........ | 374/130 |
| RE31,832 E * | 2/1985 | Samulski | ..................... | 374/131 |
| 4,568,200 A * | 2/1986 | Hatono et al. | .............. | 374/122 |
| 4,583,869 A * | 4/1986 | Chive et al. | ................. | 374/122 |
| 4,616,119 A * | 10/1986 | Shin | ............................ | 219/751 |
| 4,632,128 A * | 12/1986 | Paglione et al. | ............ | 374/121 |
| 4,650,345 A | 3/1987 | Rochas et al. | .................. | 374/9 |
| 5,020,920 A * | 6/1991 | Gopalsami et al. | ........... | 374/57 |
| 5,106,826 A * | 4/1992 | Alford et al. | ............. | 333/99 S |
| 5,176,146 A * | 1/1993 | Chivé et al. | ................. | 374/122 |
| 5,326,173 A * | 7/1994 | Evans et al. | ................. | 374/122 |
| 5,399,018 A * | 3/1995 | Hollander et al. | .......... | 374/121 |
| 5,417,494 A * | 5/1995 | Kempa et al. | .................. | 374/5 |
| 5,549,639 A * | 8/1996 | Ross | .......................... | 607/101 |
| 5,573,339 A * | 11/1996 | Woskov et al. | ............. | 374/131 |
| 5,688,050 A * | 11/1997 | Sterzer et al. | .............. | 374/122 |
| 6,329,645 B1 * | 12/2001 | Giberson et al. | ........... | 219/745 |

(Continued)

FOREIGN PATENT DOCUMENTS

DE 3605737 A1 * 8/1987 ................. 374/121

(Continued)

Primary Examiner—Diego Gutierrez
Assistant Examiner—Mirellys Jagan
(74) Attorney, Agent, or Firm—Winston & Strawn LLP

(57) ABSTRACT

An apparatus for measuring the temperature of an object. The apparatus includes a device for establishing a standing wave pattern or radiation emanating from the object and a coupling device for coupling the radiation to a detector, such as a measuring radiometer.

12 Claims, 5 Drawing Sheets

U.S. PATENT DOCUMENTS 6,469,286 B1 * 10/2002 Nobue et al. ............... 333/231
2002/0126731 A1 * 9/2002 Stergiopoulos et al. ..... 374/122

FOREIGN PATENT DOCUMENTS

| DE | 44 16 960 A1 | 11/1994 | | |
|----|---|---|---|---|
| EP | 0 182 680 | 5/1986 | | |
| EP | 549495 A1 | * | 6/1993 | ......... 374/121 |
| JP | 56094229 A | * | 7/1981 | ......... 374/122 |
| JP | 57161521 A | * | 10/1982 | ......... 374/129 |
| JP | 58058427 A | * | 4/1983 | ......... 374/121 |
| JP | 62269029 A | * | 11/1987 | ......... 374/122 |
| RU | 2054802 C1 | * | 2/1996 | |

* cited by examiner

TEMPERATURE MEASURING APPARATUS AND RELATED IMPROVEMENTS

CROSS-REFERENCE TO RELATED APPLICATION

The present application is a continuation of the U.S. national stage designation of International Application PCT/GB01/01028 filed Mar. 9, 2001, the content of which is expressly incorporated herein by reference thereto.

FIELD OF INVENTION

This invention relates to temperature measuring apparatus. The invention in particular, though not exclusively, relates to such apparatus using electromagnetic antenna cavities or cavities operating in a combination of induction field (near field) and travelling wave (far field) modes or standing-wave modes. The invention, in particular further, though not exclusively, relates to using one or more standing-wave patterns in an antenna-cavity structure to obtain a desirable form of radiometric spatial weighting function for coupling a radiometer to a region of source material whereby a temperature of the source material inside the cavity may be measured.

BACKGROUND OF INVENTION

Many industrial processes require non-invasive, non-destructive measurement of temperature within a mass of material, for example, processed food product inspection and also medical applications.

Travelling wave and induction field surface-contact type antennas have previously been used for medical applications. However, these types of antennas are not well suited to many envisaged applications. In particular, the following problems are evident:

(1) The weighting functions for this class of antenna are strongly biased to a region in direct contact with the antenna, i.e., the induction or near-field zone. The radiometric temperature measurement is, therefore, strongly biased to an object's surface region adjacent to the antenna.

(2) If there is a region of low dielectric loss material between the antenna and the glossy material of an object, such as a packaging air gap, wave modes propagating perpendicular to the antenna measurement axis may be set up, dramatically reducing the radiometric coupling to the product.

(3) If an object is electromagnetically thin in the direction of the antenna measurement axis, radiation from sources beyond the object will be coupled into the antenna together with the object material radiation giving a false temperature measurement (e.g., fluorescent lighting microwave radiation).

(4) If there is a region of low dielectric loss material between the antenna and the lossy material of an object (as in (b) above), radiation from sources around the antenna and the object will enter the antenna, again leading to a false temperature measurement.

Thermal/Infra-red imaging also only gives a surface reading and has problems in penetrating water and grease. It is also not possible to see through packaging for food.

It is an object of at least one embodiment of at least one aspect of the present invention to obviate/mitigate one or more of the disadvantages of the prior art.

It is also an object of at least one embodiment of at least one aspect of the present invention to provide a method of using natural microwave thermal radiation to measure the temperature of an object.

SUMMARY OF INVENTION

According to a first aspect of the present invention there is provided an apparatus for measuring a temperature of an object comprising:

means for establishing at least one (and preferably one) standing wave pattern of radiation emanating from the object, and means for coupling the radiation to a measuring radiometer.

It is preferred if one or more ports, probes or loops electromagnetically couple the means for establishing the at least one standing wave pattern and the measuring radiometer. The position, size, shape, orientation and construction of the ports, probes, or loops may determine coupling to the electric and/or magnetic fields of the at least one standing wave pattern.

Preferably, the means for establishing the at least one standing wave pattern is an enclosed wall structure. Advantageously, the enclosed wall structure is substantially rectangular or cylindrical, or at least part conical or pyramidal.

Preferably, the radiation is in the microwave range.

Preferably, the microwave radiation has a frequency in the range of 0.1 GHz to 30 GHz.

Preferably, the means for establishing the at least one standing wave pattern(s) are made from electrically conducting material.

Preferably, the means for establishing the at least one standing wave pattern have low-loss, high-wave impedance areas within them that provide electromagnetic isolation.

According to a second aspect of the present invention there is provided a method of measuring the temperature of an object comprising the steps of:

establishing a standing wave pattern of radiation emanating from the object, and coupling the radiation to a measuring radiometer.

According to a third aspect of the present invention there is provided a transport container including an apparatus according to the first aspect.

According to a fourth aspect of the present invention there is provided a transportation means including an apparatus according to the first aspect.

According to a fifth aspect of the present invention there is provided an apparatus for measuring a temperature of an object comprising:

a member having an open cavity and a plate which are moveable relative to one another so as to enclose the object within the cavity, wherein, in use, a standing wave pattern of radiation emanating from the object is set up within the cavity, and means for coupling the radiation to a measuring radiometer.

Preferably, the member comprises a sleeve portion.

According to a sixth aspect of the present invention there is provided a method of measuring a temperature of an object comprising the steps of:

providing a plate for receiving the object;

providing a member having an open cavity wherein, in use, the member and the plate are moveable relative to one another so as to enclose the object within the cavity, establishing a standing wave pattern of radiation emanating from the object within the cavity, and coupling the radiation to a measuring radiometer.

According to a seventh aspect of the present invention there is provided a transport container including an apparatus according to the fifth aspect.

According to an eighth aspect of the present invention there is provided a transportation means including an apparatus according to the fifth aspect.

According to a ninth aspect of the present invention there is provided a production line including an apparatus for measuring a temperature of an object according to the first or fifth aspects.

BRIEF DESCRIPTION OF DRAWINGS

Embodiments of the present invention will now be described by way of example only, and with reference to the accompanying drawings, which are.

DETAILED DESCRIPTION OF PREFERRED EMBODIMENTS

Figure 1:
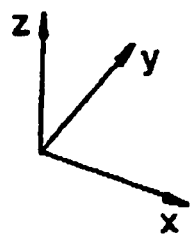
FIG. 1 is a schematic view of an apparatus for measuring a temperature of an object according to an embodiment of the present invention.
Figure 1:
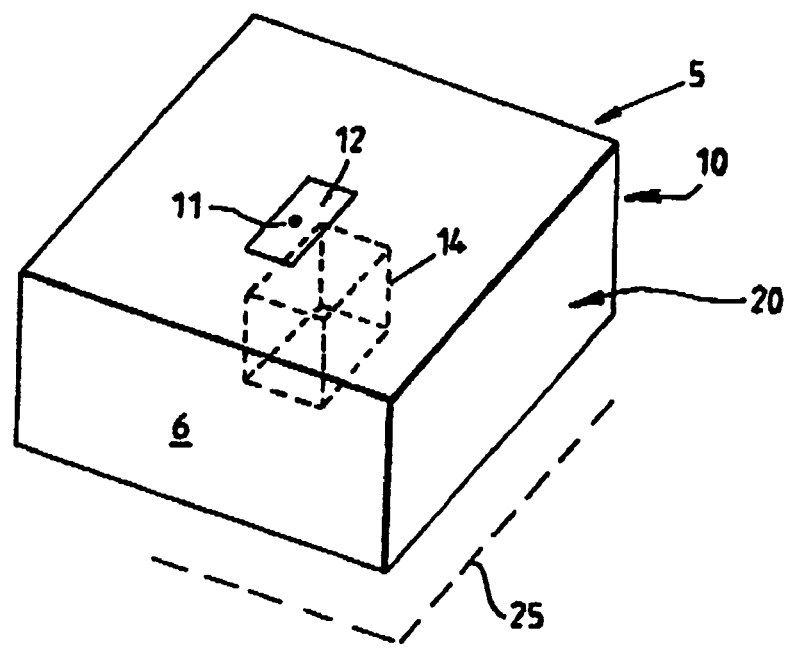

Referring initially to FIG. 1, there is shown an apparatus, generally designated 5, according to an embodiment of the present invention. The apparatus 5 is for measuring a temperature of an object or product such as a processed food product 14, and comprises means for establishing a standing wave pattern of radiation emanating from the object, and means for coupling the radiation to a detector such as a measuring radiometer 11.

The means for establishing a standing wave pattern comprises an enclosed wall structure 6, including a cavity 10 forming a measurement region. The means for coupling comprises a coupling port 12 provided on the wall structure 6.

The coupling port 12 electromagnetically connects the cavity 10 to one or more radiation signal measuring radiometer receivers 11 (forming an "antenna-cavity" structure). The cavity 10 is made from a suitable conductive material such as copper, copper plated steel and/or silver plated brass. Such materials are chosen because they have good microwave surface conductivity. Enclosing of the measurement region provides isolation from external sources of electromagnetic radiation allowing proper measurement of an effective radiation temperature of an object or product 14 within the cavity 10. As can be seen from FIG. 1, the object 14 is substantially centrally placed within the cavity 10.

A suitable cavity 10 size is typically 0.25 m×0.25 m×0.15 m. However, a wide range of sizes, e.g., from a few millimeters to a few meters can be used depending on the frequency and mode of the measurement. It is, for example, in embodiments of the present invention possible to monitor a temperature of an object within the apparatus 5 which can comprise a transport container 20 on a transportation means 25 such as a lorry, or a train, or ship, or the like.

In use, to measure the temperature of the object 14, a microwave standing wave pattern of naturally occurring microwaves from the product 14 is set up inside the cavity 10.

The microwaves are typically in the wavelength region 0.1 GHz to 30 GHz.

An apparent radiation temperature "seen" by a radiometer 11 connected to the cavity 10 will be substantially that of the material of the object 14 within the cavity 10 weighted according to a weighting function applying to the whole source (cavity and product). By weighting function is meant that although the temperatures across the whole cavity 10 contribute to the obtained measured temperature, the temperature reading is biased due to the standing wave arrangement in the cavity 10 towards a certain region of the cavity 10. Therefore, by altering the properties of the standing wave pattern, different regions of the object 14 within different parts of the cavity 10 can have their temperature measured. In general, if the radiation losses of the object 14 are much larger than the losses in the enclosing/coupling antenna-cavity structure 10, the measured temperature will be close to that of the object 14 and the antenna-cavity temperature has only a small effect.

It is characteristic of low-loss conducting wall enclosing structures, such as that shown in cavity 10, that the electromagnetic radiation within them tends to form standing wave patterns. The form of the weighting function within an antenna-cavity—which determines the spatial form of the radiation coupling of the source material to the radiometric signal measured by the radiometer 11—is determined by the standing wave pattern of the antenna-cavity and enclosed material combination. Antenna-cavity structures can thus be designed to support standing wave patterns which provide weighting functions that give stronger or weaker radiation coupling to source material at different positions in the structure. This can then allow the temperature measurement process to be biased towards regions of a product of particular importance. An example of this would be the case of a disc-shaped object or product (e.g., a food product such as a quiche), where the cooking process heats the periphery more than the center, but it is the central temperature that is particularly important for product quality and food safety.

Figure 2:
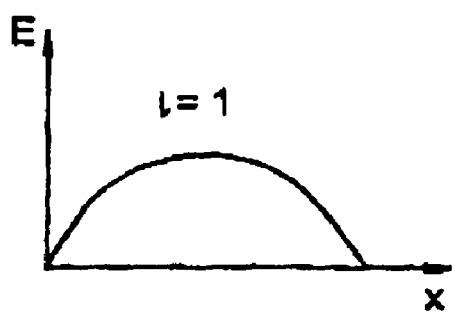
FIG. 2 is a series of graphs of electric field and power for l=1, m=1 and n=0, (with l, m and n being integral numbers defining the form of standing wave patterns in three dimensions of a cavity of the apparatus of FIG. 1)
Figure 2:
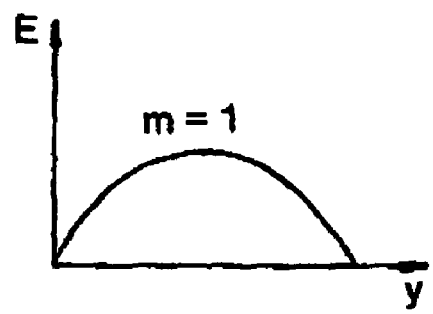
Figure 2:
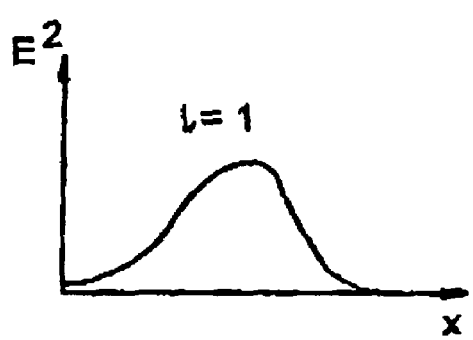
Figure 2:
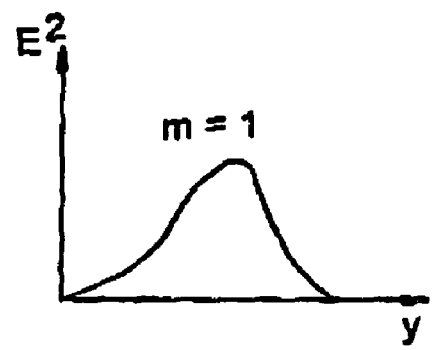
Figure 2:
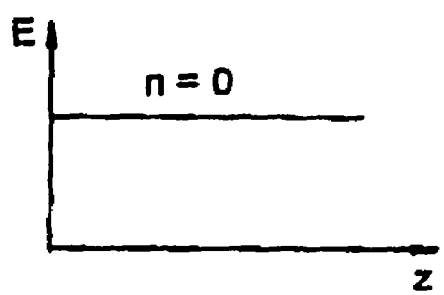

Referring to FIG. 2, there are shown field and power density profiles across the cavity 10 for a given frequency of radiation. It can be clearly seen that the signal is strongest in the center of the cavity 10, and therefore, the temperature reading will be predominantly biased by the temperature in that region. To measure the temperature of the object 14, the object 14 should therefore be placed in the center of the measurement region. The arrangement in FIG. 2, therefore, provides a centrally weighted microwave temperature measurement.

It should be noted that in FIG. 2 a uniform Z-field is used and there is therefore no variation in the vertical direction. If the Z-field was varied, a 3-D topographic surface would be obtained for the electric field and power density.

Figure 3:
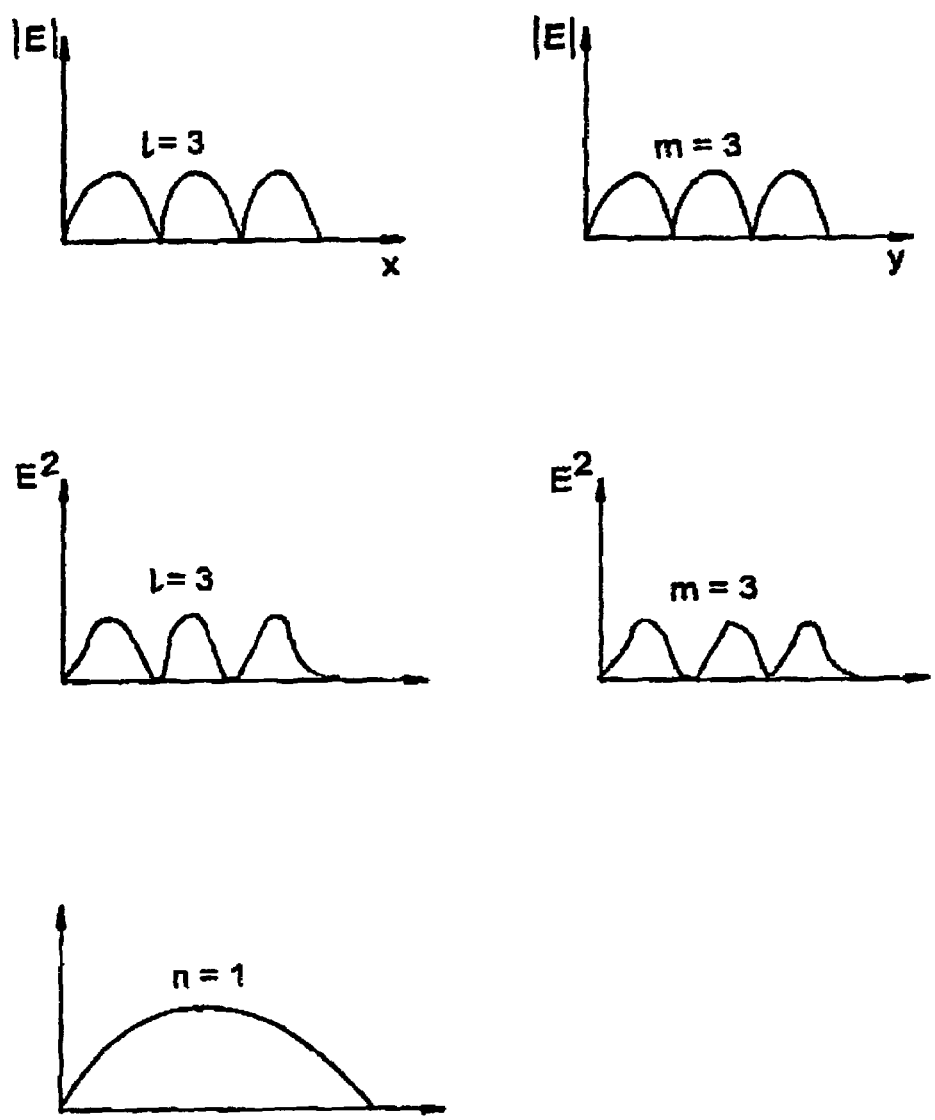
FIG. 3 is a series of graphs of electric field and power for l=1, m=1, and n=1.

FIG. 3 shows electric field and power density profiles for a further given frequency of higher frequency than the given frequency of FIG. 2. In FIG. 3, the obtained temperature reading therefore tends towards a "quasi-uniform" response across the whole of the cavity 10 tending to give an "average" temperature for the object 14 within the cavity 10.

Figure 4:
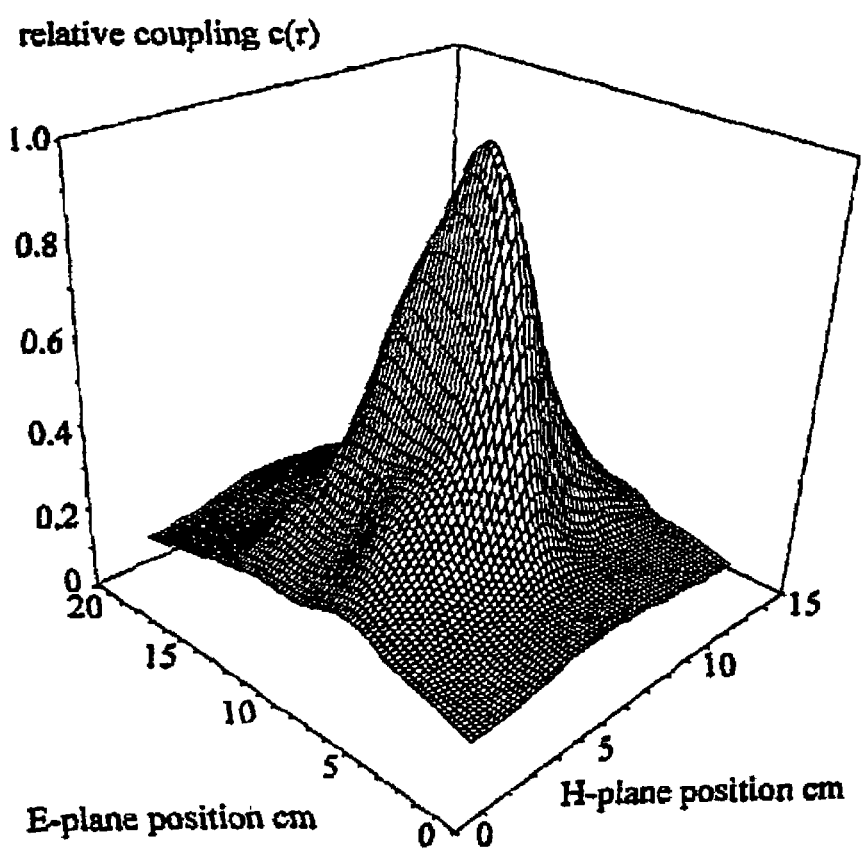
FIG. 4 is an experimental plot of cavity response versus position across a floor of a cavity of a further embodiment of an apparatus according to the present invention similar to that of FIG. 1.

Referring to FIG. 4, there is illustrated an experimental plot of cavity response versus position across a floor of a cavity of an apparatus according to a further embodiment of the present invention. As can be seen from FIG. 4, the cavity of this embodiment exploits standing wave patterns to produce a strongly peaked central response.

Figure 5A:
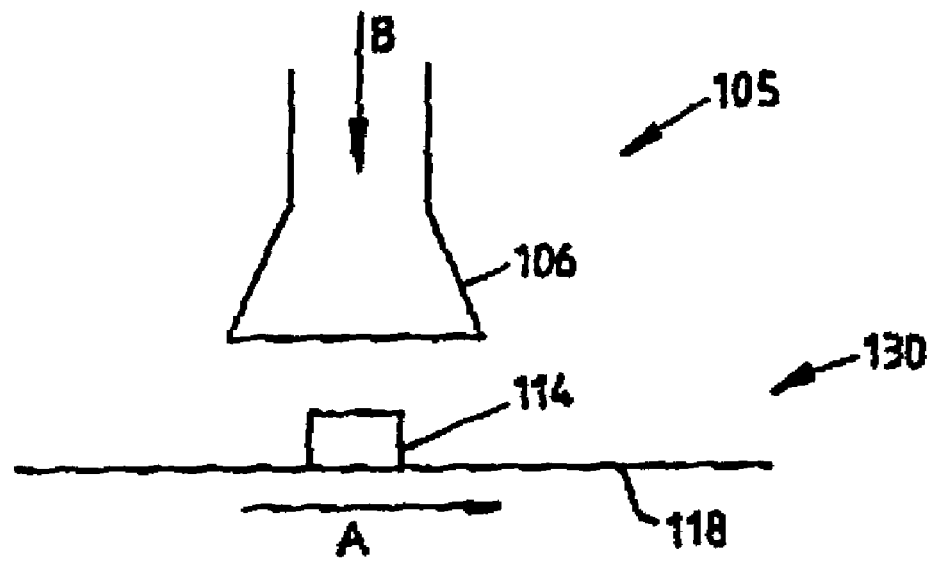
FIGS. 5(a)–(b) is a schematic perspective views of an apparatus for measuring a temperature of an object according to a yet further embodiment of the present invention.
Figure 5B:
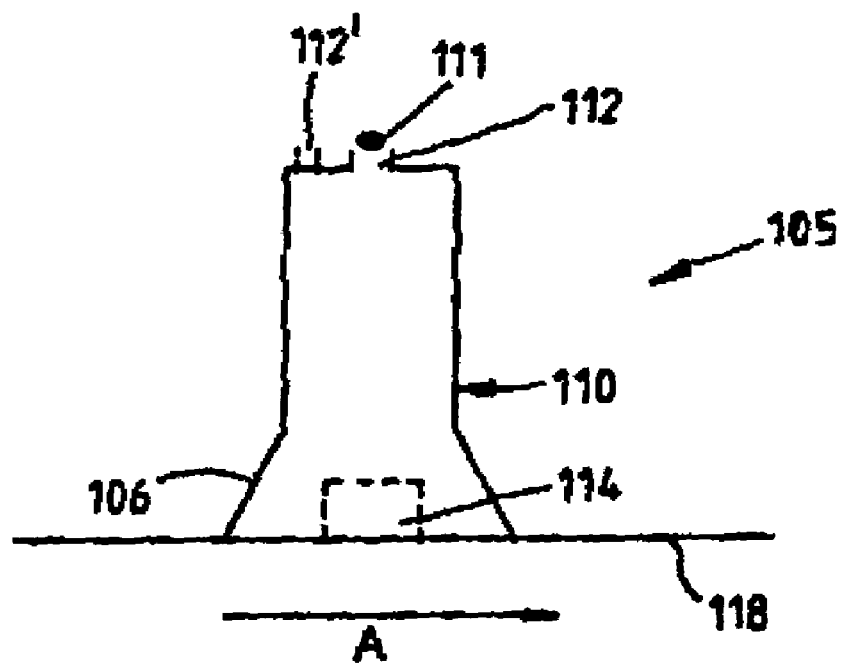

Referring now to FIGS. 5(a) and 5(b), there is shown an apparatus, generally designated 105, according to a yet further embodiment of the present invention, for measuring a temperature of an object 114 and comprising: a member 106 having an open cavity 110 and a plate surface 118 which are moveable relative to one another so as to enclose the object 114 within the cavity 110, wherein, in use, a standing wave pattern of radiation (such as naturally occurring microwave radiation) emanating from the object 114 is set up within the cavity 110, and means for coupling 112 the radiation to a measuring radiometer 111.

The member 106 comprises a sleeve portion which fits over and encloses object 114 residing on a plate surface 118 of an electrically conducting material. The plate surface 118 may comprise at least part of a conveyor belt or the like of a production line 130.

In use, the plate surface 118 is moved in direction "A" until the object 114 is below the member 106. The member 106 is then lowered in direction "B" onto the plate surface 118. After a measurement has occurred, the member 106 is lifted and plate surface 118 moved on to a next object 114, and so on.

FIG. 5(a) shows member 106 initially held above a product 114 whose temperature is to be measured. Member 106 is then lowered, as shown in FIG. 5(b), to be positioned around product 114. Product 114 sits on conducting plate surface 118. A standing wave pattern is setup within the cavity 110 such that a temperature of the product 114 can be measured by radiometer 111. This nature of measurement is useful on a high speed production line as a measurement operation may only take around 0.5 seconds.

The form of radiation standing-wave pattern in an antenna-cavity structure can be strongly influenced by the positioning, orientation and form of radiometer coupling port 112 (a probe or loop may also be used). If two or more appropriate coupling ports 112,112' are provided, each can couple to a different antenna-cavity weighting function, and each of these ports 112,112' will then allow the measurement of a radiometric temperature having a different spatial weighting across the product 114. The radiometric signals at the coupling ports 112,112', can be measured sequentially or the two coupling ports 112,112', can be measured at the same time using a synchronized 180° out of phase source reference switching configuration (not shown) in the radiometer 111.

Radiometric temperatures measured with different spatial weightings are used to estimate temperature variations across a source object 114.

It will be appreciated that the embodiments of the present invention hereinbefore described are given by way of example only, and are not meant to limit the scope thereof in any way.

For example, although the member 106 illustrated in FIGS. 5(a) and 5(b) is part conical or pyramidal, it will be appreciated that the member may be of any suitable shape, and may indeed be merely rectangular.

It will further be appreciated that the form of the radiation standing wave pattern in an antenna-cavity structure is dependent on the frequency of the radiation typically in the region 0.1 GHz to 30 GHz. Radiometric temperature measurements made at different frequencies, even through the same coupling port 112, will in general have different weighting functions. For example, referring to the resonant frequency expression for a rectangular cavity the low frequency resonance corresponding to standing wave modes designated by l, m, n =1, 1, 0 can have a weighting function for an appropriately polarized electric field which is strongly peaked in the center of the cavity; at higher frequency resonances around l, m, n =3, 3, 1 etc, the weighting function will become relatively uniform cross much of the cavity. The antenna-cavity dimensions must be chosen so as to provide the appropriate resonances at suitable radiometer measurement frequencies. Depending on the material of the source object, the frequency dependence of the attenuation factor may also be used to obtain change in weighting function within the material. For example, if the source object material has a high water content, the antenna-cavity could be dimensioned to support relatively high-order resonances producing near uniform weighting functions external to the source object for a range of frequencies over which the radiation attenuation in the source object varied appreciably. These different frequency radiometric temperatures could be efficiently and accurately measured with a multi-frequency-reference radiometer.

What is claimed is:

1. An apparatus for measuring a temperature of at least a portion of an object comprising:
   a member having an open cavity and a plate which are moveable relative to one another so as to enclose the object within the cavity, wherein, in use, at least one standing wave pattern of radiation emanating from the object is set up within the cavity, and means for coupling the at least one standing wave pattern of radiation to a measuring radiometer, wherein the measuring apparatus is designed and dimensioned so that the coupling means couples to a standing wave pattern that is focused in a particular region of the measurement region;

wherein the standing wave pattern is set up at least in part by the cavity and by the means for coupling.

2. An apparatus as claimed in claim 1, wherein the member comprises a sleeve portion.

3. A transport container comprising an apparatus for measuring a temperature of an object according to claim 1.

4. A transportation means including an apparatus for measuring a temperature of an object according to claim 1.

5. A production line including an apparatus for measuring a temperature of an object according to claim 1.

6. An apparatus as claimed in claim 1, wherein, in use, one standing wave pattern of radiation is set up.

7. A method of measuring a temperature of at least a portion of an object comprising the steps of:

providing a plate for receiving the object;

providing a member having an open cavity wherein, in use, the member and the plate are moveable relative to one mother so as to enclose the object within the cavity, establishing at least one standing wave pattern of radiation emanating from the object within the cavity, wherein said standing wave pattern is focused in a particular region of the measurement region, and designing and dimensioning the measuring apparatus for coupling the at least one standing wave pattern of radiation to a measuring radiometer;

wherein said standing wave pattern is established at least in part by the cavity and by the positioning of the object within the cavity.

8. A transport container comprising an apparatus for measuring a temperature of an object wherein the temperature is measured according to the method of claim 7.

9. A transportation means including an apparatus for measuring a temperature of an object wherein the temperature is measured according to the method of claim 7.

10. A production line including an apparatus for measuring a temperature of an object wherein the temperature is measured according to the method of claim 7.

11. A method for measuring a temperature of an object as claimed in claim 7, wherein the method is carried out in a production line.

12. A method as claimed in claim 7, wherein the temperature detected by the measuring radiometer is weighted according to a weighting function applied to a whole source comprising the object and the cavity.

* * * * *

UNITED STATES PATENT AND TRADEMARK OFFICE
CERTIFICATE OF CORRECTION

| | |
|---|---|
| PATENT NO. | : 7,059,765 B2 |
| APPLICATION NO. | : 10/236351 |
| DATED | : June 13, 2006 |
| INVENTOR(S) | : Land |

It is certified that error appears in the above-identified patent and that said Letters Patent is hereby corrected as shown below:

Column 2:
Line 21, before the paragraph beginning "It is preferred that if one or more ports, probes or loops..." add the following paragraph:
-- Preferably, the measuring radiometer is a radiation signal measurement radiometer receiver wherein the radiation temperature signal detected/measured by the radiometer is substantially representative of the temperature of at least a portion of the object. --

Column 5:
Line 36, after "apparatus, generally designated 105, according to a" delete "vet" and insert -- yet --.

Signed and Sealed this

Fifteenth Day of August, 2006

JON W. DUDAS
*Director of the United States Patent and Trademark Office*